US012583292B2

(12) United States Patent     (10) Patent No.: US 12,583,292 B2

Minero Ramales     (45) Date of Patent: Mar. 24, 2026

(54) DRIVING VANE FOR AN ACTIVE GRILLE SHUTTER DEVICE

(71) Applicant: VALEO SYSTEMES THERMIQUES, La Verriere (FR)

(72) Inventor: Victor Manuel Minero Ramales, San Luis Potosi (MX)

(73) Assignee: Valeo Systemes Thermiques

( * ) Notice: Subject to any disclaimer, the term of this patent is extended or adjusted under 35 U.S.C. 154(b) by 370 days.

(21) Appl. No.: 18/359,084

(22) Filed: Jul. 26, 2023

(65) Prior Publication Data

US 2025/0033437 A1     Jan. 30, 2025

(51) Int. Cl.
    *B60H 1/34*     (2006.01)
(52) U.S. Cl.
    CPC ... *B60H 1/3421* (2013.01); *B60H 2001/3471* (2013.01)
(58) Field of Classification Search
    CPC ..................... B60H 1/3421; B60H 2001/3471
    USPC ........................................................ 454/152
    See application file for complete search history.

(56) References Cited

U.S. PATENT DOCUMENTS

| | | | | |
|---|---|---|---|---|
| 9,333,850 B2 * | 5/2016 | Ruppert | .............. | B60K 11/085 |
| 10,029,558 B2 * | 7/2018 | Frayer, III | .......... | B60K 11/085 |
| 10,100,707 B2 * | 10/2018 | Wolf | .................... | B60K 11/085 |
| 10,166,858 B2 * | 1/2019 | Ibañez | .................... | F16H 37/12 |
| 11,230,879 B2 * | 1/2022 | Manhire | .............. | B60K 11/085 |
| 2013/0223980 A1 * | 8/2013 | Pastrick | ................... | F01D 5/00 |
| | | | | 415/1 |
| 2013/0284401 A1 * | 10/2013 | Kiener | ................ | B60K 11/085 |
| | | | | 165/98 |
| 2016/0089971 A1 * | 3/2016 | Asai | ..................... | B62D 25/085 |
| | | | | 296/193.1 |
| 2017/0326967 A1 * | 11/2017 | Brueckner | .......... | B60K 11/085 |
| 2017/0326970 A1 * | 11/2017 | Schoening | .......... | B60K 11/085 |
| 2019/0184813 A1 * | 6/2019 | Lindberg | ................ | F24F 13/15 |

* cited by examiner

*Primary Examiner* — Avinash A Savani
*Assistant Examiner* — Dana K Tighe
(74) *Attorney, Agent, or Firm* — Valeo Systemes Thermiques

(57) ABSTRACT

A driving vane for mounting on an active grille shutter device with an actuator, linkage and follower vanes, including: a connection portion for mounting on the actuator; and a lever for cooperating with the linkage in order to transmit a movement of the driving vane to at least one follower vane. The driving vane is made integral.

20 Claims, 7 Drawing Sheets

DRIVING VANE FOR AN ACTIVE GRILLE SHUTTER DEVICE

TECHNICAL FIELD

The present invention relates to a driving vane configured to be mounted on an active grille shutter device and to an active grille shutter device comprising such a driving vane.

BACKGROUND OF THE INVENTION

An active grill shutter device controls and adjusts air flow to improve the vehicle's aerodynamics and thermal performance using controlled shutters or controlled vanes.

An actuator with integrated electronic controls the opening and closing of the shutters. When air conditioning is required, the electronic controls open the vanes to improve the temperature. Conversely, when the temperature of the engine coolant allows it, the system closes the vanes to reduce noise and consumption.

Current active grille shutter device comprises a driving vane configured to be mounted on the actuator, a linkage adapted to co-operate with the driving vane and with several follower vanes, and a frame configured to receive the driving vane and the actuator forming a subassembly. Thus, the movement transmitted by the actuator to the driving vane drives the follower vanes via the linkage.

However, the current ACTIVE GRILLE SHUTTER device assembly process is complicated by the fact that the operator cannot see the driving vane being inserted into the frame and then into the actuator of the ACTIVE GRILLE SHUTTER device, since the driving vane is hidden by the linkage during insertion. This can lead the operator to a mishandling which can damage the actuator of the ACTIVE GRILLE SHUTTER device. Moreover, this increases cycle time required by the operator to assemble the active grille shutter device.

Therefore, there is a need to facilitate and simplify the assembly of the active grille shutter device comprising the driving vane for an operator, while ensuring the robustness of the active grille shutter device and the assembly method of said device.

SUMMARY OF THE INVENTION

In accordance with the purposes and benefits described herein, a driving vane is configured to be mounted on an active grille shutter (AGS) device. The driving vane comprises:
- a connection portion configured to be mounted on an actuator; and
- a lever configured to cooperate with a linkage of the active grille shutter device in order to transmit a movement of the driving vane to at least one follower vane;
  wherein the driving vane is made integral.

Thanks to the invention, the number of parts forming the driving vane is reduced.

Consequently, the manufacturing of the driving vane has become easier and the cycle time required to assemble the active grille shutter device is reduced. Therefore, the cost of such manufacturing is reduced. In addition, the reduced number of parts of the driving vane allows improving the robustness of the driving vane.

The presence of the lever as well as the connection portion makes the driving vane visible for the operator while assembling the driving vane with the actuator. For example, the driving vane can be assembled with the actuator so as to form a subassembly before being inserted into a frame of the active grille shutter device. This way, the risk of damaging the actuator during the active grille shutter device assembly process is suppressed.

According to an aspect of the invention, the driving vane is a single molded piece.

According to an aspect of the invention, the lever of the driving vane has a hook configured to co-operate with a bridge portion of the linkage.

According to an aspect of the invention, the hook is a u-shaped hook.

According to an aspect of the invention, the connection portion comprises teeth configured to engage with the cavity of an actuator.

According to an aspect of the invention, the driving vane comprises a blade connected to the lever by a rod.

According to an aspect of the invention, the blade comprises:
- an extrados part; and
- an intrados part having a plurality of ribs forming a honeycomb structure.

The invention also relates to a driving vane configured to be mounted on an active grille shutter device, said driving vane comprises:
- a connection portion configured to be mounted on an actuator; and
- a lever configured to cooperate with a linkage of the active grille shutter device in order to transmit a movement of the driving vane to at least one follower vane;
- wherein the lever of the driving vane has a hook configured to cooperate with the linkage.

According to an aspect of the invention, the hook is configured to cooperate with a pin of the linkage.

According to an aspect of the invention, the pin forms a bridge portion between two flanges of the linkage.

The invention also relates to a subassembly comprising:
- an actuator configured to be assembled with a driving vane configured to be mounted on an active grille shutter device;
- the driving vane configured to be assembled with the actuator, said driving vane comprises:
  - a connection portion configured to be mounted on an actuator; and
  - a lever configured to cooperate with a linkage of the active grille shutter device in order to transmit a movement of the driving vane to at least one follower vane;
- wherein the driving vane is made integral.

The invention also relates to a subassembly comprising:
- an actuator configured to be assembled with a driving vane configured to be mounted on an active grille shutter device;
- the driving vane configured to be assembled with the actuator, said driving vane comprises:
  - a connection portion configured to be mounted on an actuator; and
  - a lever configured to cooperate with a linkage of the active grille shutter device in order to transmit a movement of the driving vane to at least one follower vane;
- wherein the lever of the driving vane has a hook configured to cooperate with the linkage.

According to an aspect of the invention, the actuator comprises a cavity having a complementary shape of the connection portion of the driving vane.

According to an aspect of the invention, the cavity is rotatable by a motor of the actuator.

The invention also relates to an active grille shutter device comprising: a subassembly comprising:

an actuator configured to be assembled with a driving vane configured to be mounted on the active grille shutter device, the driving vane configured to be assembled with the actuator, said driving vane comprising:

a connection portion configured to be mounted on an actuator; and a lever configured to cooperate with a linkage of the active grille shutter device in order to transmit a movement of the driving vane to at least one follower vane;

wherein the driving vane is made integral;

the linkage adapted to co-operate with the lever of the driving vane and with the follower vane; and a frame configured to receive the subassembly.

The invention also relates to an active grille shutter device comprising:

a subassembly comprising:

an actuator configured to be assembled with a driving vane configured to be mounted on the active grille shutter device, the driving vane configured to be assembled with the actuator, said driving vane comprising:

a connection portion configured to be mounted on an actuator; and a lever configured to cooperate with a linkage of the active grille shutter device in order to transmit a movement of the driving vane to at least one follower vane;

wherein the lever of the driving vane has a hook configured to cooperate with the linkage, the linkage adapted to co-operate with the lever of the driving vane and with the follower vane; and a frame configured to receive the subassembly.

The driving vane can be molded together with follower vanes in a same mold.

According to an aspect of the invention, the linkage comprises a pin configured to cooperate with the lever.

According to an aspect of the invention, the pin forms a bridge portion between two flanges of the linkage.

According to an aspect of the invention, the linkage is movable between two end positions corresponding to a fully open position of the active grille shutter device and to a closed position of the active grille shutter device.

The cooperation between the pin and the lever allows the linkage to move between the two end positions.

According to an aspect of the invention, the linkage includes a slit arranged to expose a bridge portion of the linkage and the lever of the driving vane.

According to an aspect of the invention, the slit is an oblong shaped slit.

According to an aspect of the invention, the frame comprises:

two side walls linking an upper wall and a lower wall; and an intermediate portion bridging the upper wall and the lower wall, said intermediate portion is between the two side walls so as to create two apertures at both sides of the intermediate portion;

each aperture is configured to receive a group of vanes, only one of the group of vanes comprises the driving vane.

According to an aspect of the invention, the group of vanes comprising:

the driving vane, and/or a plurality of follower vanes.

The active grille shutter device allows the actuator to drive at least two groups of vanes located on both sides of the actuator (or of the intermediate portion) while reducing the cost of the device and the cost of the device assembly.

According to an aspect of the invention, the linkage is configured to be connected to all follower vanes.

In other words, only one linkage is needed for all follower vanes.

According to an aspect of the invention, the linkage comprises two lateral connection walls, each lateral connection wall being connected to the follower vanes.

According to an aspect of the invention, the two lateral connection walls are parallel to each other.

According to an aspect of the invention, the linkage comprises a base wall between the two lateral connection walls so as to form a U-shaped cross section.

According to an aspect of the invention, the oblong shaped slit is formed on the base wall of the linkage.

According to an aspect of the invention, the base wall is flat.

According to an aspect of the invention, the intermediate portion comprises at least a vane cover arranged to partially cover the driving vane and at least one follower vane.

According to an aspect of the invention, the follower vane includes:

a first end configured to cooperate with the intermediate portion; and a second end configured to cooperate with the linkage.

According to an aspect of the invention, the follower vane comprises a plate at one of the sides of the follower vane, said plate comprises said first end and said second end of the follower vane.

According to an aspect of the invention, the dimensions of the first end are larger than those of the second end.

According to an aspect of the invention, the lateral connection wall comprises holes, each hole being arranged to receive the second end of the follower vanes.

According to an aspect of the invention, the driving vane comprises an end configured to cooperate with one of the side walls of the frame.

In yet another possible embodiment, the intermediate portion is symmetrical with respect to the two side walls, such that the two apertures have the same dimensions.

In one additional possible embodiment, the intermediate portion is asymmetrical with respect to the two side walls, such that the two apertures have different dimensions.

According to an aspect of the invention, the intermediate portion comprises two side connection walls, each side connection wall being connected to the follower vanes.

According to an aspect of the invention, one of the side connection walls comprises a rod holder configured to receive the rod of the driving vane.

According to an aspect of the invention, the rod holder is a U-shaped rod holder.

According to an aspect of the invention, the side connection wall comprises orifices, each orifice being arranged to receive the first end of the follower vanes and the connection portion of the driving vane.

According to an aspect of the invention, the two side connection walls are parallel to each other.

According to an aspect of the invention, the intermediate portion has a roof portion between the two side connection walls so as to form a U-shaped cross section.

According to an aspect of the invention, the frame comprises at least one opening arranged to receive an electrical connection portion of the actuator of the subassembly.

According to an aspect of the invention, the opening is aligned with longest length of the intermediate portion.

According to an aspect of the invention, the linkage is made integral.

According to an aspect of the invention, the linkage is a molded part.

According to an aspect of the invention, the actuator is mounted on the intermediate portion of the frame.

The invention also relates to a method for assembling an active grille shutter device, said device comprising:

a subassembly comprising:

an actuator configured to be assembled with a driving vane configured to be mounted on the active grille shutter device, the driving vane configured to be assembled with the actuator, said driving vane comprising:

a connection portion configured to be mounted on an actuator; and a lever configured to cooperate with a linkage of the active grille shutter device in order to transmit a movement of the driving vane to at least one follower vane;

wherein the driving vane is made integral;

the linkage adapted to co-operate with the lever of the driving vane and with the follower vane; and a frame configured to receive the subassembly;

said method comprising the steps of:

forming the subassembly comprising the actuator and driving vane;

mounting the subassembly into the frame of the active grille shutter device.

Thanks to the invention, the assembly process has become simpler and more cost effective.

According to an aspect of the invention, the method further comprising the step of:

attaching the actuator of the subassembly into the frame.

According to an aspect of the invention, the actuator is attached into the frame by screwing.

The invention also relates to a method for assembling an active grille shutter device, said device comprising:

a subassembly comprising:

an actuator configured to be assembled with a driving vane configured to be mounted on the active grille shutter device, the driving vane configured to be assembled with the actuator, said driving vane comprising:

a connection portion configured to be mounted on an actuator; and a lever configured to cooperate with a linkage of the active grille shutter device in order to transmit a movement of the driving vane to at least one follower vane;

wherein the lever of the driving vane has a hook configured to cooperate with the linkage, the linkage adapted to co-operate with the lever of the driving vane and with the follower vane; and a frame configured to receive the subassembly;

said method comprising the steps of:

forming the subassembly comprising the actuator and driving vane;

mounting the subassembly into the frame of the active grille shutter device.

In the following description, there are shown and described several embodiments of the driving vane, the active grille shutter device and method for assembling the active grille shutter device. As it should be realized, said driving vane, device and related methods, are capable of other, different embodiments and their several details are capable of modification in various, obvious aspects all without departing from the driving vane, the device and the methods set forth and described in the following claims.

Accordingly, the drawings and descriptions should be regarded as illustrative in nature and not as restrictive.

BRIEF DESCRIPTION OF DRAWINGS

It should be noted that all of the features and configurations described above are purely examples. Other features, details and advantages of the invention will become clearer on reading the detailed description set out below, together with several embodiments provided purely as examples and by way of indication, with reference to the attached schematic drawings, in which.

DETAILED DESCRIPTION OF THE INVENTION

In the various figures, identical elements bear the same reference signs.

The following embodiments are examples. Although the description refers to one or more embodiments, this does not necessarily mean that each reference relates to the same embodiment, or that the features only apply to a single embodiment. Individual features of various embodiments can also be combined or interchanged in order to create other embodiments.

Figure 1:
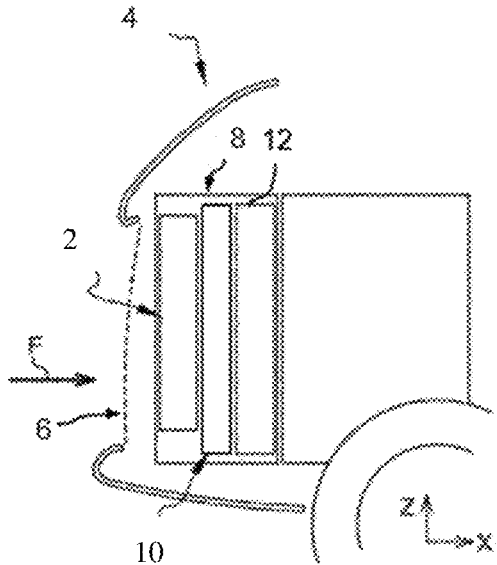
FIG. 1 schematically shows, in side view, the front end of a motor vehicle comprising an active grill shutter device.

FIG. 1 shows, in a sectional side view, an active grille shutter device 2 for shutting off an air inlet for an air flow F arranged at the front end of a motor vehicle 4. The air flow F flows substantially parallel to a direction X which corresponds to the longitudinal axis of the motor vehicle 4. The active grill shutter device 2 is in particular arranged behind a grille 6 fitted at the front end of the motor vehicle 4. A cooling module 8 which includes at least one heat exchanger 10, 12 through which the air flow F is intended to pass as it enters the motor vehicle 4 via the grille 6, is also placed behind the grille 6. The heat exchanger or exchangers 10, 12 extend in planes parallel to those generated by the directions Y and Z of the trihedron XYZ. In the example shown in FIG. 1, the cooling module 8 includes more specifically two heat exchangers 10 and 12 which are arranged downstream of the active grille shutter device along the axis X.

The cooling module 8 comprises for example an upstream heat exchanger 10 (left-hand side in FIG. 1), upstream relative to the direction of circulation of the air flow F, and a downstream heat exchanger 12 (right-hand side in FIG. 1) arranged in series along the longitudinal axis X of the motor vehicle 4. In this particular arrangement, it is the upstream heat exchanger 10 through which the air flow F passes first, and the downstream heat exchanger 12 second.

The upstream heat exchanger 10 is for example a cooling radiator, referred to as a low-temperature cooling radiator, which acts to cool a coolant in a heat exchange loop, referred to as a low-temperature loop, and comprising in particular an air-conditioning condenser and/or a charge air cooler. The downstream heat exchanger 12 is, for example, a high-temperature cooling radiator intended to cool a coolant in a heat exchange loop comprising an engine of the vehicle 4. The air that passes through this downstream exchanger 12 cools the engine coolant.

Referring now to FIGS. 2 to 6 generally, there is shown an active grille shutter device 2 comprising a subassembly 14 and a frame 16 configured to receive the subassembly 14.

The subassembly 14 comprises an actuator 18 configured to be assembled with a driving vane 20 configured to be mounted on the active grille shutter device 2. The subassembly 14 further comprises the driving vane 20 configured to be assembled with the actuator 18.

Said driving vane 20, made integral, comprises a connection portion 22 configured to be mounted on an actuator 18 and a lever 24 configured to cooperate with a linkage 26 of the active grille shutter device 2 in order to transmit a movement of the driving vane 20 to seven follower vanes 28. What is meant here by the term 'integral' is that the driving vane 20 is a single piece, not formed by two separate elements connected to each other. For example, the driving vane 20 can be made integral by manufacturing it all at once in a dedicated injection mold. The connection portion 22 can include teeth 90 configured to engage with the toothed cavity 91 of the actuator 18.

The lever 24 of the driving vane 20 has a U-shaped hook 30 configured to cooperate with the linkage 26.

The linkage 26 is adapted to co-operate with the lever 24 of the driving vane 20 and with the follower vanes 28.

Figure 2:
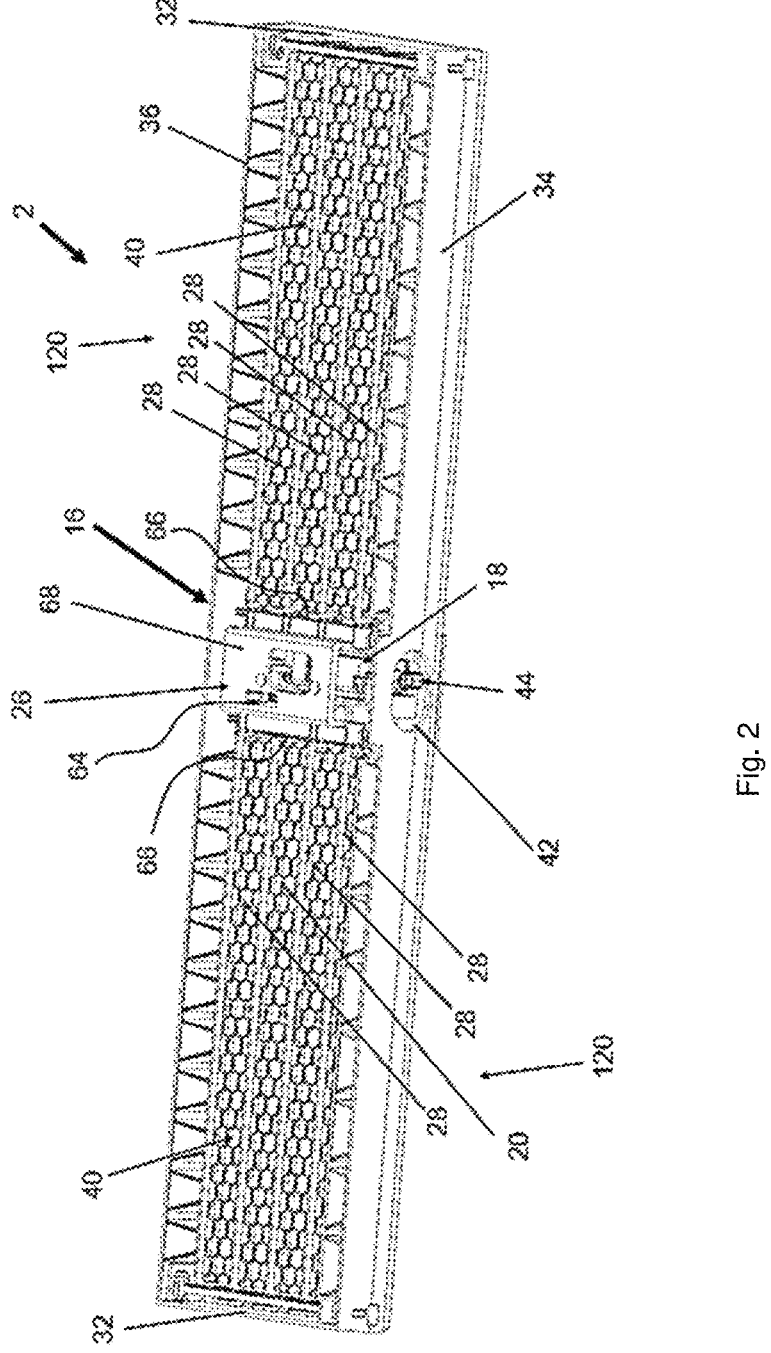
FIG. 2 is a top perspective view of the rear side of an active grille shutter device.
Figure 3:
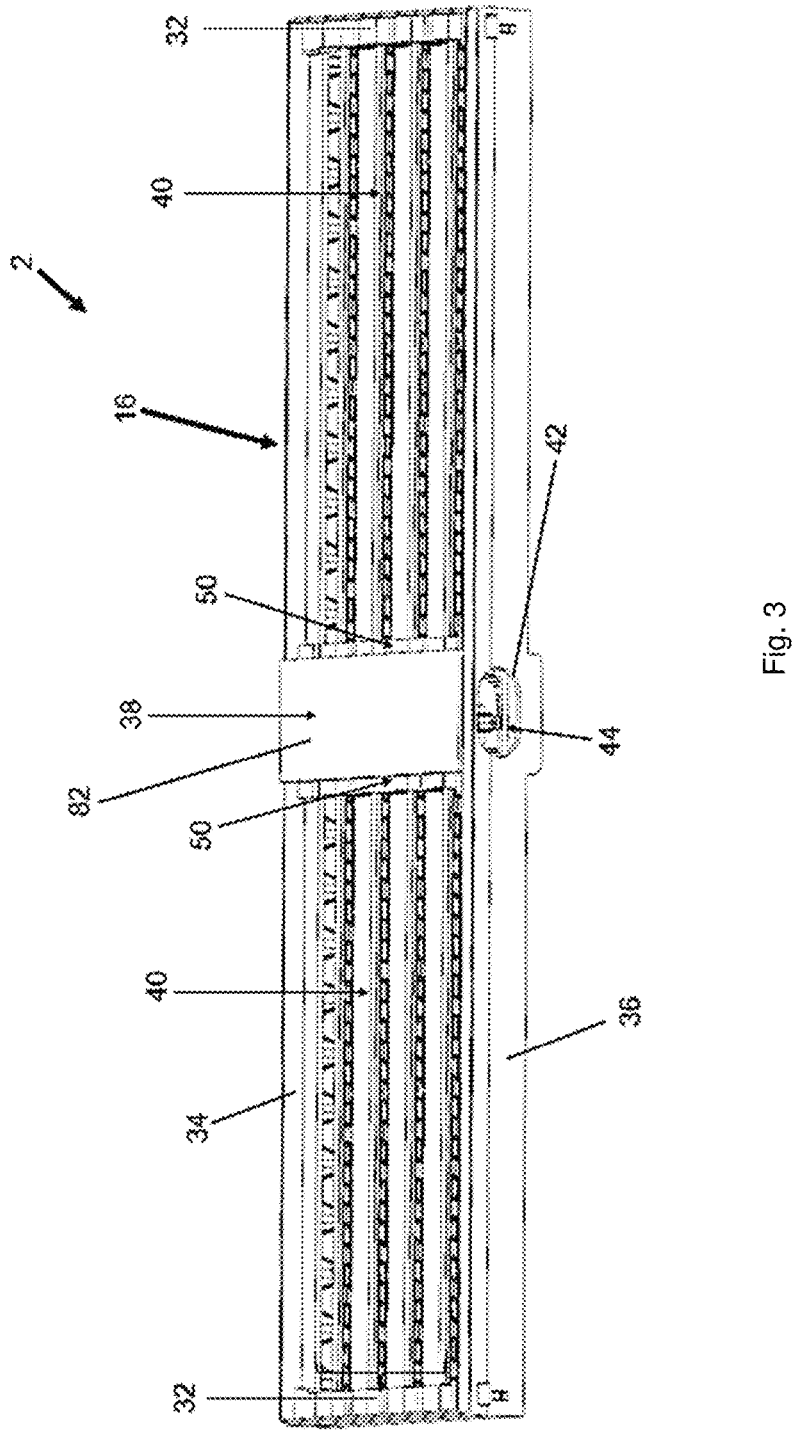
FIG. 3 is a top perspective view of the front side of the active grille shutter device of FIG. 2.

Referring now to FIGS. 2 to 3, the details of the frame 16 are shown.

Referring in particular to FIG. 3 illustrating the front side of the active grille shutter device 2, the frame 16 comprises two side walls 32 linking an upper wall 34 and a lower wall 36 and an intermediate portion 38 bridging the upper wall 34 and the lower wall 36. The actuator 18 is mounted on the intermediate portion 38 of the frame 16.

Said intermediate portion 38 is between the two side walls 32 so as to create two apertures 40 at both sides of the intermediate portion 38. Each aperture 40 is configured to receive a group of vanes 120 comprising the driving vane 20 and a plurality of follower vanes 28. Only one of the group of vanes 120 comprises the driving vane 20. Said group 120 comprises three follower vanes 28 and the driving vane 20. The other group of vanes 120 comprises four follower vanes 28.

The frame 16 comprises one opening 42 arranged to receive an electrical connection portion 44 of the actuator 18 of the subassembly 14. The opening 42 is aligned with longest length of the intermediate portion 38.

The intermediate portion 38 comprises a vane cover 50 arranged to partially cover the driving vane 20 and the follower vanes 28.

Referring to FIG. 3, the intermediate portion 38 is symmetrical with respect to the two side walls 32, such that the two apertures 40 have the same dimensions.

In one possible non-represented embodiment, the intermediate portion 38 can be asymmetrical with respect to the two side walls 32, such that the two apertures 40 have different dimensions.

Thanks to the invention, the number of parts forming the driving vane 20 is reduced. As a consequence, the manufacturing of the driving vane 20 can become easier and the cycle time required to assemble the active grille shutter device 2 is reduced. Therefore, the cost of such manufacturing is reduced. In addition, the reduced number of parts of the driving vane 20 allows to improve the robustness of the driving vane 20.

The presence of the lever 24 as well as the connection portion 22 makes the driving vane 20 visible for the operator while assembling the driving vane 20 with the actuator 18. For example, the driving vane 20 can be assembled with the actuator 18 so as to form the subassembly 14 before being inserted into the frame 16 of the active grille shutter device 2. This way, the risk of damaging the actuator 18 during the active grille shutter device 2 assembly process is suppressed.

The presence of the lever 24 allows the driving vane 20 to be compatible with an actuator 18 that is not configured to cooperate directly with the connection portion 22. In other words, there is provided a connection between the actuator 18 (with an output shaft) and the driving vane 20 (start shaft) through which the whole torque is transferred to the driving vane 20. The lever 24 (an arm section) is then integrated to the driving vane 20 (the start shaft) to transmit this torque to the rest of the driving vane 20 though the linkage 26.

The active grille shutter device 2 allows the actuator 18 to drive two groups of vanes 120 located on both sides of the actuator 18 while reducing the cost of the device 2 and the cost of the device 2 assembly.

The driving vane 20 can be molded together with follower vanes 28 in a same mold.

Figure 4:
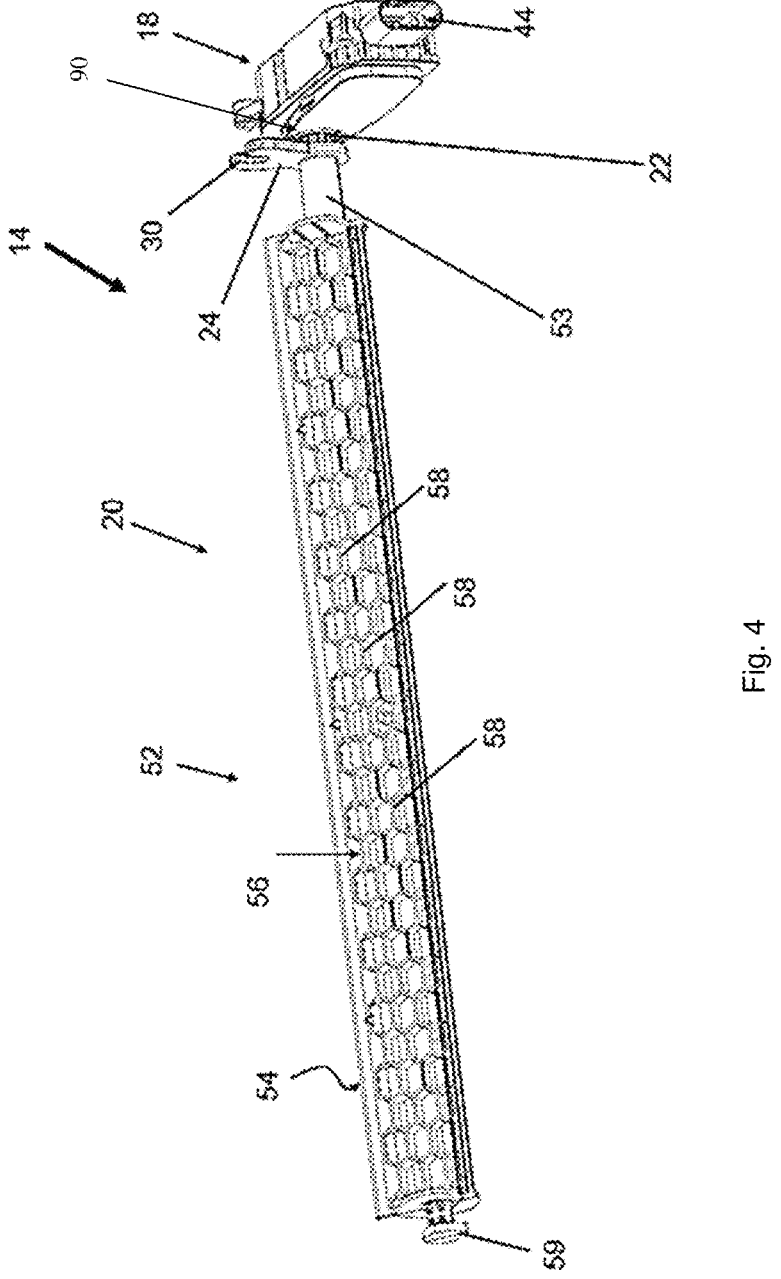
FIG. 4 is a top perspective view of a subassembly.

Referring now to FIG. 4, the details of the subassembly 14 comprising the driving vane 20 are shown. The driving vane 20 comprises a blade 52 connected to the lever 24 by a rod 53. The blade 52 comprises an extrados part 54 and an intrados part 56 having a plurality of ribs 58 forming a honeycomb structure. The driving vane 20 comprises an end 59 configured to cooperate with one of the side walls of the frame 16.

Figure 5:
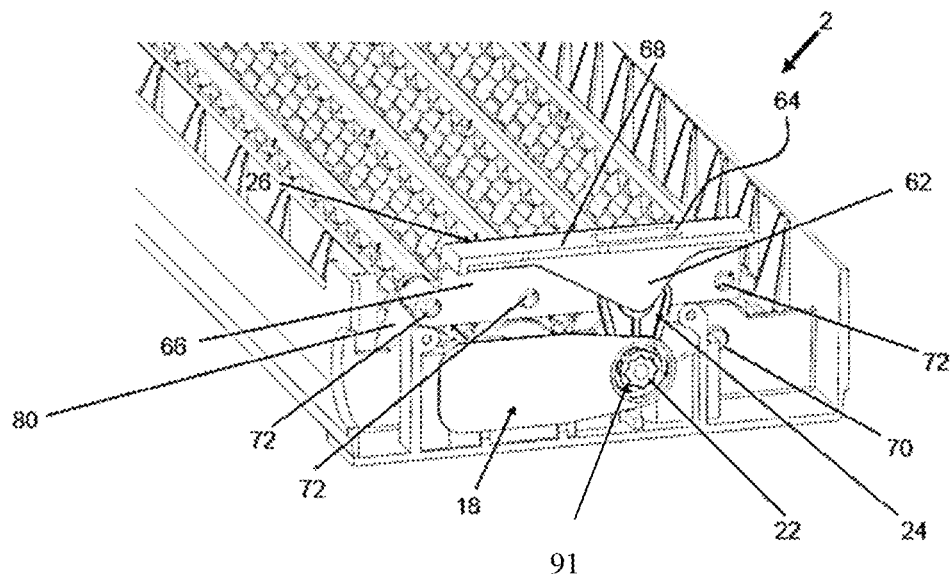
FIG. 5 is a side schematic view with a sectional side view of portions of the rear side of the active grill device.
Figure 6:
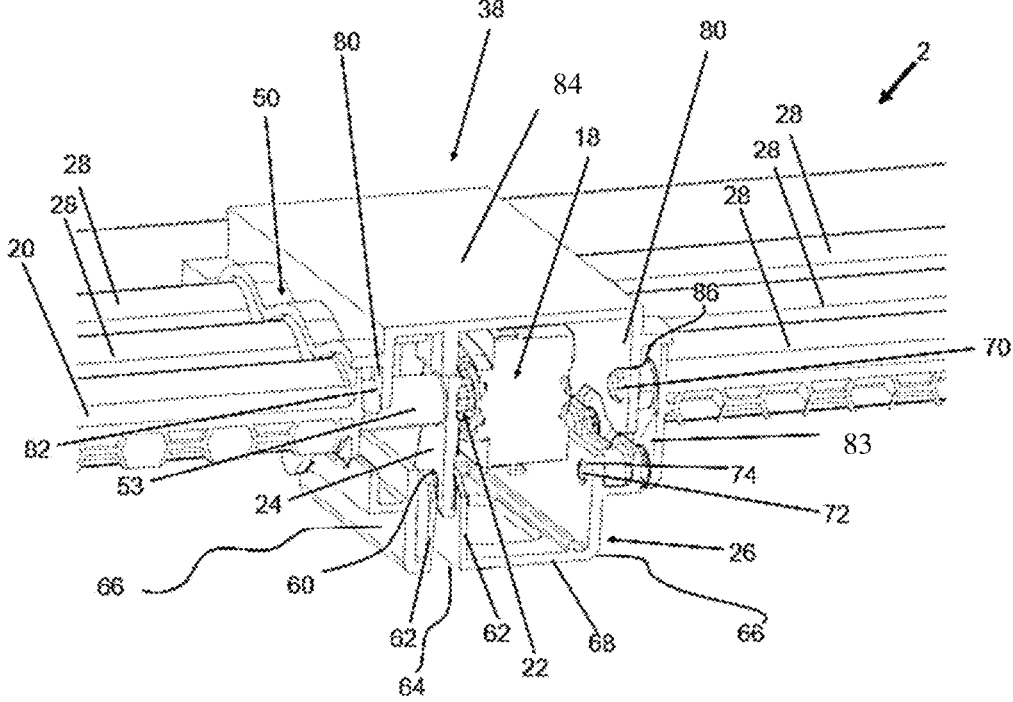
FIG. 6 is a top perspective view with a sectional side view of portions of the front side of the active grill device.

Referring now to FIGS. 5 to 6, the details of the linkage 26 and the lever 24 are shown.

The linkage 26 comprises a pin 60 configured to cooperate with the lever 24. The pin 60 forms a bridge portion between two flanges 62 of the linkage 26. The linkage 26 is made integral and is a molded part.

The linkage 26 is movable between two end positions corresponding to a fully open position of the active grille shutter device 2 and to a closed position of the active grille shutter device 2.

The cooperation between the pin 60 and the lever 24 allows the linkage 26 to move between the two end positions.

The linkage 26 includes an oblong shaped slit 64 arranged to expose the bridge portion of the linkage 26 and the lever 24 of the driving vane 20.

The linkage 26 is configured to be connected to all follower vanes 28. In other words, only one linkage 26 is needed for all follower vanes 28.

As illustrated on FIGS. 5 and 6, the linkage 26 comprises two lateral connection walls 66 which are parallel to each other. Each lateral connection wall 66 is connected to the follower vanes 28.

The linkage 26 comprises a flat base wall 68 between the two lateral connection walls 66 so as to form a U-shaped cross section.

The oblong shaped slit 64 is formed on the flat base wall 68 of the linkage 26.

Referring to FIG. 5, the follower vanes 28 each include a first end 70 configured to cooperate with the intermediate portion 38 and a second end 72 configured to cooperate with the linkage 26.

Referring to FIG. 6, the lateral connection wall 66 of the linkage 26 comprises holes 74. Each hole 74 is arranged to receive the second end 72 of the follower vanes 28. The intermediate portion 38 comprises two side connection walls 80 which are parallel to each other. Each side connection wall 80 is connected to the follower vanes 28.

The follower vane 28 comprises a plate 83 at one of the sides of the follower vane 28, wherein said plate 83 comprises said first end 70 and said second end 72 of the follower vane 28. These first and second ends 70, 72 have cylindrical shape. The dimensions, for example the diameter, of the first end 70 are larger than those of the second end 72.

One of the side connection walls 80 comprises a U-shaped rod holder 82 configured to receive the rod 53 of the driving vane 20. The side connection wall 80 comprises orifices 86. Each orifice is arranged to receive the first end of the follower vanes 28 and the connection portion 22 of the driving vane 20. The intermediate portion 38 has a roof portion 84 between the two side connection walls 80 so as to form a U-shaped cross section.

Figure 7:
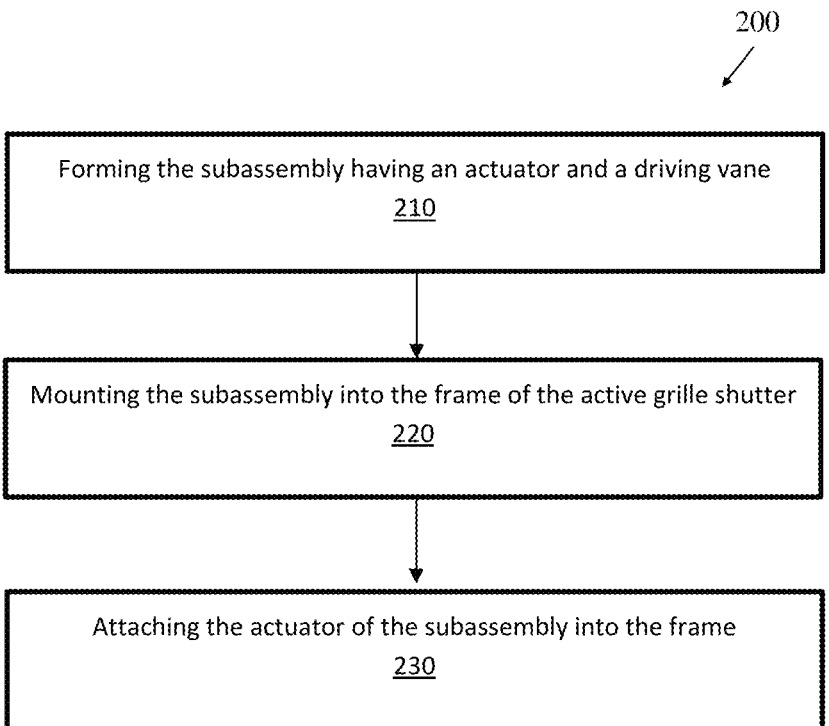
FIG. 7 is a flow chart illustrating a method for assembling active grille shutter device.

Referring now to FIG. 7, the details of a method 200 for assembling the active grille shutter device 2 are shown.

Said method 200 comprising the steps of:
forming the subassembly 14 comprising the actuator 18 and driving vane 20 (Step 210);
mounting the subassembly 14 into the frame 16 of the active grille shutter device (Step 220).

Thanks to the invention, the assembly process has become simpler and more cost effective.

The method 200 further comprises the step of attaching the actuator 18 of the subassembly 14 into the frame 16. The actuator 18 is attached into the frame 16 by screwing.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A driving vane for mounting on an active grille shutter device with an actuator, a linkage and a follower vane, comprising:
   a connection portion for mounting on the actuator, the connection portion including teeth for engaging with a toothed cavity of the actuator; and
   a lever for cooperating with the linkage in order to transmit a movement of the driving vane to the follower vane;
   wherein the driving vane is made integral.

2. The driving vane according to claim 1, wherein the driving vane is a single molded piece.

3. The driving vane according to claim 1, wherein the lever has a hook for cooperating with a bridge portion of the linkage.

4. The driving vane according to claim 1, further comprising a blade connected to the lever by a rod.

5. An active griller shutter device comprising:
   a frame;
   a subassembly connected to the frame, including:
      an actuator,
      a driving vane with a connection portion, the connection portion including teeth for engaging with a cavity of the actuator;
      a plurality of follower vanes,
      a linkage operatively linked with the driving vane and the plurality of the follower vanes, wherein the driving vane is connected with the actuator by the connection portion and includes a lever configured to operate with the linkage in order to transmit a movement of the driving vane to the plurality of the follower vanes;
   wherein the driving vane is made integral.

6. The active grille shutter device according to claim 5, wherein the linkage is movable between two end positions corresponding to a fully open position of the active grille shutter device and to a closed position of the active grille shutter device.

7. The active grille shutter device according to claim 5, wherein the linkage includes two lateral connection walls, each being connected to the plurality of the follower vanes.

8. The active grille shutter according to claim 7, wherein the linkage includes a base wall between the two lateral connection walls so as to form a U-shaped cross section.

9. The active grille shutter device according to claim 5, wherein the linkage includes a pin configured to cooperate with the lever.

10. The active grille shutter device according to claim 9, wherein the linkage includes two flanges, with the pin forming a bridge portion between the two flanges, wherein the linkage includes a slit arranged between the two flanges to expose the bridge portion and the lever of the driving vane.

11. The active grille shutter device according to claim 10, wherein the linkage includes a base wall between the two lateral connection walls so as to form a U-shaped cross section, wherein the slit is of an oblong shape and is formed on the base wall.

12. The active grille shutter device according to claim 5, wherein the frame includes:
   two side walls linking an upper wall and a lower wall; and
   an intermediate portion bridging the upper wall and the lower wall, said intermediate portion being arranged between the two side walls so as to create two apertures at both sides of the intermediate portion;
   wherein each aperture is configured to receive at least one follower vane of the plurality of the follower vanes, with one of the two apertures being configured to receive the driving vane.

13. The active grille shutter device according to claim 12, wherein the actuator is mounted on the intermediate portion of the frame.

14. The active grille shutter device according to claim 12, wherein the intermediate portion is equidistant with respect to the two side walls so that the two apertures have the same dimensions.

15. The active grille shutter device according to claim 12, wherein the intermediate portion is closer to one of the two side walls than the other of the two side walls so that the two apertures have different dimensions.

16. A driving vane for mounting on an active grille shutter device with an actuator, a linkage and a plurality of follower vanes, comprising:
   a connection portion for mounting on the actuator;
   wherein the linkage includes two lateral connection walls each connected to the plurality of follower vanes, two flanges, and a pin forming a bridge portion between the two flanges; and
   a lever for cooperating with the linkage in order to transmit a movement of the driving vane to the plurality of follower vanes.

17. The driving vane according to claim 16, wherein the linkage includes a slit arranged between the two flanges to expose the bridge portion and the lever.

18. The driving vane according to claim 17, wherein the linkage includes a base wall between the two lateral connection walls so as to form a U-shaped cross section.

19. The driving vane according to claim 18, wherein the slit is of an oblong shape and is formed on the base wall.

20. The driving vane according to claim 16, wherein the connection portion includes teeth for engaging with a toothed cavity of the actuator.

\* \* \* \* \*